United States Patent [19]

Onizawa

[11] 4,262,098
[45] Apr. 14, 1981

[54] CURABLE COMPOSITION OF AMINO ACID AND CHLORINATED POLYETHYLENE

[75] Inventor: Masao Onizawa, Ohmiya, Japan

[73] Assignee: Sanyo Trading Co., Ltd., Japan

[21] Appl. No.: 923,402

[22] Filed: Jul. 10, 1978

[30] Foreign Application Priority Data

Jul. 21, 1977 [JP] Japan .................................. 52-86688

[51] Int. Cl.² .......................... C08F 8/32; C08L 31/00
[52] U.S. Cl. ...................................... 525/330; 260/3.3; 525/187; 525/194; 525/334; 525/346; 525/343; 525/181; 525/354; 524/184
[58] Field of Search ............... 525/330, 346, 334, 181, 525/184

[56] References Cited

FOREIGN PATENT DOCUMENTS 1350764 12/1963 France ....................................... 526/33

Primary Examiner—C. A. Henderson
Attorney, Agent, or Firm—Wenderoth, Lind & Ponack

[57] ABSTRACT

A halogenated polyethylene, or a mixture of it with a sulfur-curable rubber and/or a vinyl chloride resin can be cured with a combination of sulfur and/or a sulfur donor, and at least one amino acid selected from the group consisting of lysine, ornithine, arginine and proline.

2 Claims, 4 Drawing Figures

CURABLE COMPOSITION OF AMINO ACID AND CHLORINATED POLYETHYLENE

BACKGROUND OF THE INVENTION

This invention relates to the curing of a halogenated polyethylene with sulfur and/or a sulfur donor and a specified amino acid, and to the curing of a composition comprising a halogenated polyethylene, a specified sulfur-curable rubber and/or a vinyl chloride resin with sulfur and/or a sulfur donor and a specified amino acid.

Halogenated polyethylenes are known polymers prepared by halogenating polyethylene which have superior ozone resistance, weatherability, fire retardancy, low flex cracking, etc. It is known that halogenated polyethylenes are cured with suitable curing agents for use as rubbery elastomers. Chlorinated polyethylene is the most widely used halogenated polyethylene.

Typical known methods for curing halogenated polyethylenes include the use of organic Peroxides such as dicumyl Peroxide as a curing agent, and the use of a mixed curing agent composed of a metal oxide such as magnesium oxide and an organic compound known as a curing accelerator for rubber, such as ethylenethiourea or tetramethylthiuram disulfide. These methods, however, have one or more defects. In the case of curing with organic perioxides, open steam cure cannot be employed because it will cause surface tackiness, and the method of curing is limited to a press cure process. The latter method has the defect that because the metal oxide remains in the cured rubber product and may dissolve out during use of the product to cause health hazards, the cured rubber product cannot be used as rubber articles for medicines or foodstuffs (for example, stoppers for bottles). Furthermore, during the processing of rubber, the noxious metal oxide particles scatter about to affect the health of the working personnel.

Since halogenated polyethylenes have good miscibility with general rubbers such as natural rubber or SBR, curing of a blend of a halogenated polyethylene and a general rubber has been suggested. A typical method for curing such a blend involves the use of an organic peroxide which is a curing agent both for the halogenated polyethylene and the general rubber. As previously stated, this method has the defect that the open steam cure process cannot be employed. Another method for curing this blend comprises using separate curing systems for the halogenated polyethylene and the general rubber, and curing the blend by using these two curing systems simultaneously. A typical example of such a mixed curing system is composed of a curing agent comprising magnesium oxide and ethylenethiourea for curing the halogenated polyethylene, and sulfur and/or a sulfur donor, a vulcanization accelerator and a vulcanization activator for curing the general rubber. In order to obtain satisfactory curing of the general rubber, it is usually desirable to employ zinc oxide as the vulcanization activator. Zinc oxide, however, has a degenerative action on the halogenated polyethylene.

The present inventor has now found that a halogenated polyethylene can be well cured with a combination of sulfur and/or a sulfur donor and a specified amino acid. It has also been found that a composition composed of a halogenated polyethylene, a specified sulfur-curable rubber and/or a vinyl chloride resin can be cured well with a novel curing system composed of sulfur and/or a sulfur donor and a specified amino acid. The novel curing system has the advantage that it permits the application of both open steam cure and press cure, and does not require the use of a vulcanization activator such as zinc oxide.

SUMMARY OF THE INVENTION

According to this invention, there is provided a curable composition comprising a halogenated polyethylene, sulfur and/or a sulfur donor, and at least one amino acid selected from the group consisting of lysine, ornithine, arginine and proline (to be referred to a first type curable composition).

The invention also provides a curable composition comprising a halogenated polyethylene, a specified sulfur-curable rubber and/or a vinyl chloride resin, sulfur and/or a sulfur donor, and at least one amino acid selected from the group consisting of lysine, ornithine, arginine and proline (to be referred to as a second type curable composition).

The specified sulfur-curable rubber that can be used in the second type curable composition includes styrene/butadiene rubber, acrylonitrile/butadiene rubber, polybutadiene rubber, acrylonitrile/isoprene rubber, alfin rubber, carboxylated acrylonitrile/butadiene rubber, acrylonitrile/butadiene/isoprene rubber, propylene oxide rubber, propylene/butadiene rubber, polyisoprene rubber, natural rubber, butadiene/methyl methacrylate rubber, brominated butyl rubber, brominated ethylene propylene rubber, brominated ethylene/propylene/diene terpolymer, and epihalohydrin rubber having allyl glycidyl ether copolymerized therewith. These rubbers will be referred to generically as "sulfur-curable rubber" in this application.

DETAILED DESCRIPTION OF THE INVENTION

Figure 1:
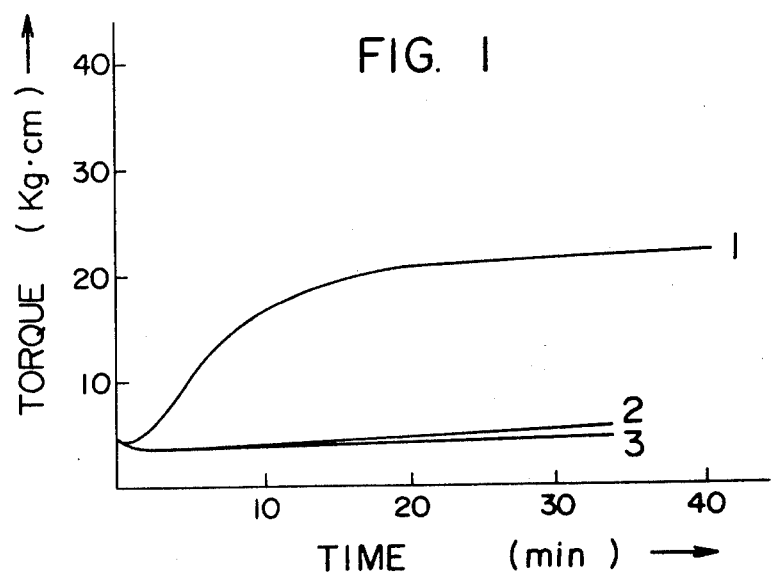
FIGS. 1 to 4 show the cure curves obtained in Examples and Comparative Example.

The first type curable composition of this invention will first be described.

The halogenated polyethylene used as a first ingredient in the first type curable composition is a known polymer which can be produced by the halogenation of polyethylene. Chlorinated polyethylene is especially preferred. The halogenated polyethylene has a halogen content of generally 5 to 50% by weight, preferably 20 to 45% by weight.

A second ingredient of the first type curable composition is sulfur, or a sulfur donor, or a mixture of sulfur and the sulfur donor. The "sulfur donor", as used herein, denotes a substance which releases sulfur in the active state at the crosslinking temperature. The sulfur donor itself is known, and includes, for example, sulfur compounds such as sulfur monochloride, sulfur dichloride, morpholine disulfide, alkylphenol disulfides, N,N'-dithio-bis-(hexahydro-2H-azepinone-2), and phosphorus-containing polysulfides; thiazole compounds such as 2-(4'-morpholinodiethio) benzothiazole; and thiuram polysulfides such as tetramethylthiuram disulfide, activated tetramethylthiuram disulfide, tetraethylthiuram disulfide, tetrabutylthiuram disulfide, N,N'-dimethyl-N,N'-diphenyldiphenylthiuram disulfide, dipentamethylene disulfide, dipentamethylenethiuram disulfide, dipentamethylenethiuram hexasulfide, dicyclopentamethylenethiuram disulfide, and mixed alkylthiuram disulfide.

The amino acid used as a third ingredient of the first type curable composition includes lysine, ornithine, arginine and proline. The composition must contain at least one of these amino acids.

The first type curable composition usually contains 0.01 to 30 parts by weight, preferably 0.1 to 15 parts by weight, of the amino acid, 0.01 to 30 parts by weight, preferably 0.1 to 15 parts by weight, of sulfur and/or a sulfur donor, and 100 parts by weight of the halogenated polyethylene.

The second type curable composition will now be described.

The halogenated polyethylene, sulfur and/or a sulfur donor and the amino acid used in the second type curable composition are the same as those described with regard to the first type curable composition.

The sulfur-curable rubber used in the second type curable composition of this invention includes the rubbers listed hereinabove. These rubbers are known rubbers which can be cured with a sulfur curing system. At least one of these rubbers is used in the invention.

The vinyl chloride resin used in the second type curable composition of this invention denotes a homopolymer of vinyl chloride, a copolymer of vinyl chloride with a vinyl chloride content of at least 50 mole%, preferably at least 80 mole%, and mixtures of the homopolymer or copolymer with another polymer. Examples of the comonomers that can be copolymerized with vinyl chloride are vinyl acetate, vinylidene chloride, acrylic acid, methacrylic acid, acrylic or methacrylic esters, maleic acid, maleic esters, acrylonitrile, ethylene, propylene, vinyl caproate, vinyl stearate, and vinyl cetyl ether. At least one of these comonomers in an amount of not more than 50 mole%, preferably not more than 20 mole%, is copolymerized with vinyl chloride (for example, by random copolymerization, graft copolymerization, or block copolymerization) to provide copolymers which can be used in this invention as the vinyl chloride resin.

A graft copolymer prepared by grafting at least 50 mole%, based on the total weight, of a vinyl chloride monomer on such a polymer as an ethylene/vinyl acetate copolymer or chlorinated polyethylene can also be used in this invention as the vinyl chloride resin.

The second type curable composition of this invention contains the sulfur-curable rubber and/or the vinyl chloride resin as essential ingredients. These ingredients and the halogenated polyethylene are co-cured with a mixed curing agent composed of sulfur and/or a sulfur donor and a specified amino acid.

The second type curable composition usually contains 100 parts by weight of the halogenated polyethylene, and 1 to 5,000 parts, preferably 5 to 1,900 parts by weight, of both the sulfur curable rubber and/or vinyl chloride resin. The ratio between the sulfur-curable rubber and the vinyl chloride resin is variable between 0 and 100%. The amount of the amino acid, and the amount of sulfur and/or sulfur donor are 0.01 to 30 parts by weight, preferably 0.1 to 15 parts by weight, per 100 parts by weight of the halogenated polyethylene, the sulfur-curable rubber and/or the vinyl chloride resin combined.

Both the first type and second type curable composition can be cured at temperatures (for example, 130° to 190° C.) and pressures (for example 20 to 180 kg/cm$^2$) which are usually employed in the curing of rubbers.

The novel feature of the present invention is that a mixed curing agent consisting of a specified amino acid and sulfur and/or a sulfur donor is used for the halogenated polyethylene, or for a blend of the halogenated polyethylene, the sulfur-curable rubber and/or the vinyl chloride resin.

Halogenated polyethylenes, for example chlorinated polyethylene, scarcely cure with sulfur and/or a sulfur donor alone, as demonstrated by comparative runs given hereinbelow. There is only a slight rise in torque in the cure curve of this polymer. Specifically, when a chlorinated polyethylene composition containing only sulfur and/or a sulfur donor is heat-treated by an electric hot press, a cured rubber plate cannot be obtained. A chlorinated polyethylene composition containing only the amino acid specified in this invention (e.g., lysine), when heated, shows only a slight rise in torque in its cure curve as shown in a comparative run given hereinbelow. In other words, chlorinated polyethylene cannot be well cured with lysine, ornithine, proline, and arginine used singly.

The rubber used in the second-type curable composition should be selected from those specified in the present invention. As shown in Comparative Example, isoprene/isobutylene rubber (butyl rubber) cannot be cured.

In view of the above facts, it is quite unexpected that the combination of at least one amino acid selected from ornithine, arginine, proline and lysine and sulfur and/or a sulfur donor can well cure the halogenated polyethylene and the composition consisting of the halogenated polyethylene, the sulfurcurable rubber and/or vinyl chloride resin.

The curable compositions of this invention may contain additives conventionally used for rubbers, halogenated polyethylenes and vinyl chloride resins, such as compounding chemicals, reinforcing agents, fillers, plasticizers, processing aids, stabilizers, lubricants, antioxidants, and vulcanization accelerators.

Curing of the curable composition of halogenated polyethylene can afford cured products suitable for use as bottle stoppers used in the field of medical treatment, and liners for crown caps. Curing of the curable composition comprising the halogenated polyethylene, the sulfur-curable rubber and/or vinyl chloride resin can give cured products which can be suitably used as automobile tires, tubes, inner liners, fuel hoses, radiator hoses, gas hoses, O-rings, oil seals, shaft seals, diaphragms, steam hoses, antivibration rubber, shoe soles, cable coverings, roofing sheets, sashes, linings, belts, and anode caps.

The following examples are given to illustrate the present invention. In these examples, the numerical figures representing the constituent proportions of curable compositions are in parts by weight. Various tests in these examples were performed by the following methods.

Cure curves

Measured by an oscillating disc rheometer (TSS method).

Tensile strength, elongation, and modulus

Measured in accordance with JIS K-6301 by using a Schopper-type tensile tester at a pulling speed of 500 mm/min.

Hardness

Measured in accordance with JIS K-6301 using a JIS-A type hardness tester.

EXAMPLE 1

This Example shows that chlorinated polyethylene can be well cured with a mixed curing agent consisting of sulfur and lysine or ornithine.

Each of the compositions shown in Table 1 was prepared in a customary manner by using rolls, and then cured for each of the time periods indicated in Table 1 by using an electric hot-press kept at 170° C. The properties of the cured products are shown in Table 1.

TABLE 1

| Compounding recipe | Run No. 1 | Comparative Run No. 1 | Comparative Run No. 2 | Run No. 2 |
|---|---|---|---|---|
| Chlorinated polyethylene (*1) | 100 | 100 | 100 | 100 |
| Sulfur | 2 | — | 2 | 2 |
| Lysine | 5 | 5 | — | — |
| Ornithine | — | — | — | 3 |
| Curing temperature (°C.) | 170 | 170 | 170 | 170 |
| Curing time (minutes) | 15 | 20 | 20 | 20 |
| 300% modulus (kg/cm$^2$) | 41 | | | 30 |
| Tensile strength (kg/cm$^2$) | 41 | (*2), | (*3) | 30 |
| Elongation (%) | 460 | | | 430 |
| Hardness | 57 | | | 51 |

(*1) DAISOLAC MR-104, a trademark for chlorinated polyethylene made by Osaka Soda Co., Ltd.
(*2) and (*3): No measurement was made because curing did not take place.

It is clear from the experimental results or Runs Nos. 1 and 2 that chlorinated polyethylene can be well cured with sulfur and lysine or ornithine. For confirmation, the cure curve of the composition used in Run No. 1 was determined by an oscillating disc rheometer kept at a temperature of 170° C. The cure curve obtained is shown in FIG. 1 (curve 1).

In an attempt to cure chlorinated polyethylene with sulfur or lysine alone, the composition was heated at 170° C. for 20 minutes (Comparative Runs Ros. 1 and 2). But a cured rubber plate could not be obtained. For confirmation, the time-torque curve at 170° C. of each of the compositions was determined. As shown in curve 2 (Comparative Run No. 1) and curve 3 (Comparative Run No. 2) of FIG. 1, when lysine alone is used, only a very slight rise of torque is noted. When sulfur is used, there is scarcely any rise in torque.

EXAMPLE 2

This Example shows that chlorinated polyethylene can be cured with morpholine disulfide (sulfur donor) and lysine.

The same experiments as in Example 1 were performed in accordance with the compounding recipes shown in Table 2.

The properties of the resulting cured rubbers are shown in Table 2.

In Comparative Run No. 3, the composition containing only morpholine disulfide was heated at 170° C. for 20 minutes. But a cured rubber plate could not be obtained.

TABLE 2

| Compounding recipe | Run No. 3 | Comparative Run No. 3 |
|---|---|---|
| Chlorinated polyethylene (*1) | 100 | 100 |
| Morpholine disulfide (*2) | 1.5 | 1.5 |
| Lysine | 2 | — |
| Curing temperature (°C.) | 170 | 170 |
| Curing time (minutes) | 20 | 20 |
| 300% Modulus (kg/cm$^2$) | 20 | |
| Tensile strength (kg/cm$^2$) | 89 | |

TABLE 2-continued

| Compounding recipe | Run No. 3 | Comparative Run No. 3 |
|---|---|---|
| Elongation (%) | 600 | (*3) |
| Hardness | 41 | |

(*1) Same as in Example 1
(*2) VULNOC (a registered trademark for a product of Ouchi Shinko Kagaku Kogyo K.K.
(*3) No measurement was made because curing did not take place.

EXAMPLE 3

This Example shows that a composition comprising chlorinated polyethylene and styrene/butadiene rubber can be well cured with a combination of sulfur or a sulfur donor (morpholine disulfide or dipentamethylenethiuram tetrasulfide) and lysine.

Figure 2:
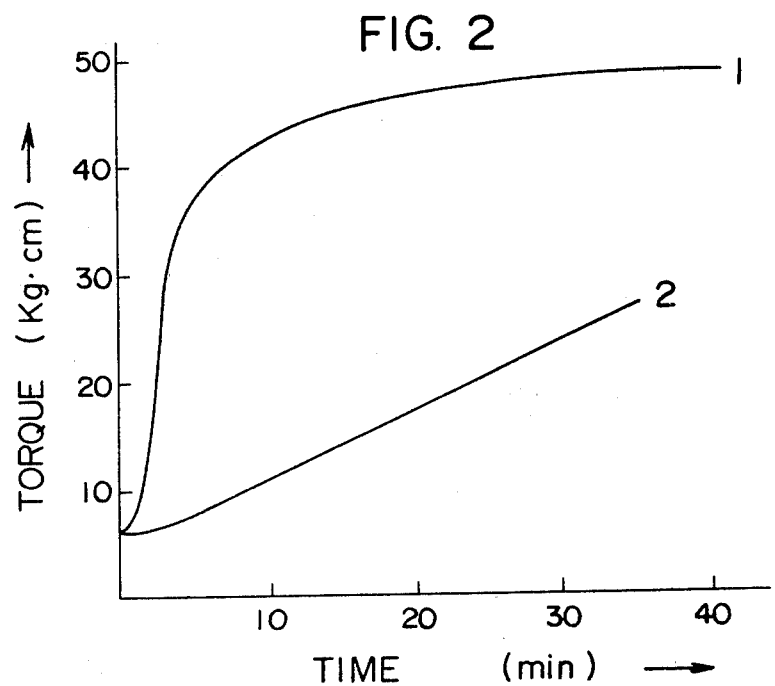

The same experiments as in Example 1 were performed in accordance with the compounding recipes shown in Table 3. The results are shown in Table 3. The cure curve at 170° C. of the composition in Run No. 6 is shown in FIG. 2 (curve 1).

For comparison, Run No. 6 was treated except that lysine was not used (Comparative Run No. 4). The results are shown in Table 3, and the cure curve of the composition of Comparative Run No. 2 is shown in curve 2 of FIG. 2.

It is seen from the properties of the cured rubbers that the modulus and tensile strength of the composition of chlorinated polyethylene and styrene/butadiene rubber increases to a greater extent by curing with a mixture of sulfur and lysine than curing with sulfur alone. It is also seen from the cure curves that a rise in torque takes place better with the mixed curing agent than with sulfur alone, and the composition gives a desirable cure curve for commercial application.

TABLE 3

| Compounding recipe | Run No. 4 | Run No. 5 | Run No. 6 | Comparative Run No. 4 |
|---|---|---|---|---|
| Styrene/butadiene rubber (*1) | 75 | 75 | 75 | 75 |
| Chlorinated polyethylene (*2) | 25 | 25 | 25 | 25 |
| SRF-L carbon black (*3) | 40 | 40 | 40 | 40 |
| Dipentamethylenethiuram tetrasulfide (*4) | 2 | — | — | — |
| Morpholine disulfide (*5) | — | 2 | — | — |
| Sulfur | — | — | 2 | 2 |
| Lysine | 3 | 3 | 3 | — |
| Curing temperature (°C.) | 170 | 170 | 170 | 170 |
| Curing time (minutes) | 15 | 20 | 20 | 20 |
| 300% Modulus (kg/cm$^2$) | 122 | 71 | 176 | 29 |
| Tensile strength (kg/cm$^2$) | 234 | 161 | 232 | 82 |

TABLE 3-continued

| Compounding recipe | Run No. 4 | Run No. 5 | Run No. 6 | Comparative Run No. 4 |
|---|---|---|---|---|
| Elongation (%) | 540 | 660 | 380 | 820 |
| Hardness | 65 | 62 | 69 | 55 |

(*1): Sumitomo SBR 1502 (a registered trademark for styrene/butadiene rubber made by Sumitomo Chemical Co., Ltd.)
(*2): Same as in Example 1.
(*3): Semi-reinforcing furnace low structure carbon black added as a reinforcing agent.
(*4): NOCCELER TRA (a registered trademark for a product of Ouchi Shinko Kagaku Kogyo K.K.)
(*5): Same as in Example 2.

EXAMPLE 4

Figure 3:
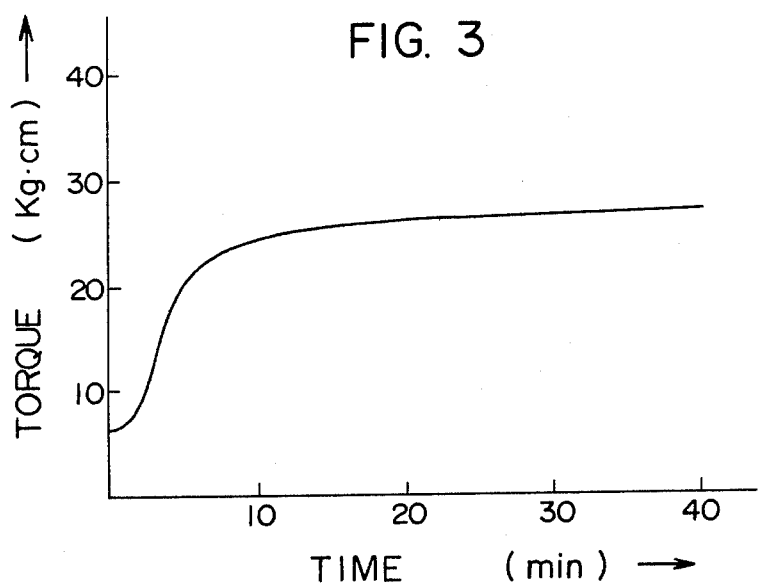

This Example shows that a composition comprising chlorinated polyethylene, polybutadiene rubber and natural rubber can be well cured with a mixed curing agent consisting of sulfur and proline. The experiment was carried out in the same way as in Example 1 using the compounding recipe shown in Table 4. The properties of the cured rubber are shown in Table 4, and the cure curve of the composition is shown in FIG. 3.

TABLE 4

| Compounding recipe | Run No. 7 |
|---|---|
| Chlorinated polyethylene (*1) | 50 |
| Polybutadiene (*2) | 50 |
| Natural rubber RSS No. 1 | 25 |
| SRF-L carbon black (*3) | 40 |
| Sulfur | 2 |
| Proline | 5 |
| Curing conditions: cured at 170° C. for 15 minutes. | |
| 200% Modulus (kg/cm$^2$) | 60 |
| Tensile strength (kg/cm$^2$) | 93 |
| Elongation (%) | 280 |
| Hardness | 65 |

(*1): Same as in Example 1
(*2): Diene NF-55R (a registered trademark for a product of Asahi Chemical Industry Co., Ltd.)
(*3): Same as in Example 3.

EXAMPLE 5

This Example shows that a composition comprising chlorinated polyethylene and propylene oxide rubber can be well cured with a combination of sulfur and lysine or ornithine.

The same experiments as in Example 1 were performed, and the properties of the cured rubber are shown in Table 5.

TABLE 5

| Compounding recipe | Run No. 8 | Run No. 9 |
|---|---|---|
| Chlorinated polyethylene (*1) | 50 | 50 |
| Propylene oxide rubber (*2) | 50 | 50 |
| SRF-L carbon black (*3) | 40 | 40 |
| Sulfur | 2 | 2 |
| Lysine | 3 | — |
| Ornithine | — | 2 |
| Curing temperature (°C.) | 170 | 170 |
| Curing time (minutes) | 15 | 15 |
| 300% Modulus (kg/cm$^2$) | 116 | 110 |
| Tensile strength (kg/cm$^2$) | 142 | 147 |
| Elongation (%) | 380 | 470 |
| Hardness | 75 | 75 |

(*1): Same as in Example 1.
(*2): Parel 58 (a registered trademark for propylene oxide rubber made by Hercules Company).
(*3): Same as in Example 3.

EXAMPLE 6

This Example shows that a composition comprising chlorinated polyethylene and acrylonitrile/butadiene rubber or polyisoprene rubber can be well cured with a combination of sulfur and lysine.

The same experiments as in Example 1 were carried out, and the properties of the resulting cured rubbers are shown in Table 6.

TABLE 6

| Compounding recipe | Run No. 10 | Run No. 11 |
|---|---|---|
| Chlorinated polyethylene (*1) | 30 | 70 |
| Acrylonitrile/butadiene rubber (*2) | 70 | — |
| Polyisoprene rubber (*3) | — | 30 |
| SRF-L carbon black (*4) | 40 | 40 |
| Sulfur | 2 | 3 |
| Lysine | 3 | 5 |
| Curing temperature (°C.) | 170 | 170 |
| Curing time (minutes) | 15 | 15 |
| 300% Modulus (kg/cm$^2$) | 238 | 116 |
| Tensile strength (kg/cm$^2$) | 270 | 202 |
| Hardness | 76 | 73 |

(*1): Same as in Example 1.
(*2): Polysar Krynac 3450 (a registered trademark for acrylonitrile/butadiene rubber made by Polysar Ltd.).
(*3): Kuraprene IR-10 (a registered trademark for a product of Kuraray Co., Ltd.).
(*4): Same as in Example 3.

EXAMPLE 7

This Example shows that a composition comprising chlorinated polyethylene and acrylonitrile/isoprene rubber or acrylonitrile/butadiene/isoprene rubber can be well cured with a combination of sulfur, lysine and arginine.

The experiments were performed in the same way as in Example 1 in accordance with the compounding recipes shown in Example 1. The properties of the cured rubbers are shown in Table 7.

TABLE 7

| Compounding recipe | Run No. 12 | Run No. 13 | Run No. 14 | Run No. 15 |
|---|---|---|---|---|
| Chlorinated polyethylene (*1) | 90 | 70 | 90 | 70 |
| Acrylonitrile/isoprene rubber (*2) | 10 | 30 | — | — |
| Acrylonitrile/butadiene/isoprene rubber (*3) | — | — | 10 | 30 |
| SRF-L carbon black (*4) | 20 | 20 | 20 | 20 |
| Sulfur | 2 | 2 | 2 | 2 |
| Lysine | 1.3 | 1.3 | 1.3 | 1.3 |
| Arginine | 2.5 | 2.5 | 2.5 | 2.5 |
| Curing temperature (°C.) | 175 | 175 | 175 | 175 |
| Curing time (minutes) | 15 | 15 | 15 | 15 |
| 300% Modulus (kg/cm$^2$) | 80 | 61 | 97 | 87 |
| Tensile strength (kg/cm$^2$) | 194 | 249 | 196 | 201 |
| Elongation (%) | 460 | 530 | 420 | 360 |
| Hardness | 75 | 68 | 74 | 67 |

(*1): Same as in Example 1.
(*2): Krynac 833 (a registered trademark for a product made by Polysar Ltd.).
(*3): Nipol DN-1201 (a registered trademark for a product of Nippon Zeon Co., Ltd.).
(*4): Same as in Example 3.

EXAMPLE 8

This Example shows that a composition comprising chlorinated polyethylene and acrylonitrile/butadiene rubber and a composition comprising chlorinated polyethylene and polybutadiene rubber can be well cured with the combination curing agent of this invention.

The same experiments as in Example 1 were carried out in accordance with the compounding recipes shown in Table 8. The properties of the resulting cured rubbers are shown in Table 8.

TABLE 8

| Compounding recipe | Run No. 16 | Run No. 17 |
| --- | --- | --- |
| Chlorinated polyethylene (*1) | 50 | 50 |
| Acrylonitrile/butadiene rubber (*2) | 20 | 20 |
| Polybutadiene rubber (*3) | 50 | 50 |
| SRF-L carbon black (*4) | 40 | 40 |
| Ornithine | 1.5 | — |
| Arginine | — | 1.5 |
| Lysine | — | 1.0 |
| Sulfur | 1.5 | 1.5 |
| Curing temperature (°C.) | 170 | 170 |
| Curing time (minutes) | 15 | 15 |
| 300% Modulus (kg/cm$^2$) | 163 | 190 |
| Elongation (%) | 560 | 500 |
| Hardness | 67 | 67 |

(*1): Same as in Example 1.
(*2): Nipon 1042 (a registered trademark for a product of Nippon Zeon Co., Ltd.).
(*3): Same as in Example 4.
(*4): Same as in Example 3.

EXAMPLE 9

This Example shows that a composition comprising chlorinated polyethylene, vinyl chloride resin and acrylonitrile/butadiene rubber can be well cured with a combination of lysine and sulfur.

The same experiments as in Example 1 was performed in accordance with the compounding recipe shown in Table 9. The results are also shown in Table 9.

TABLE 9

| Compounding recipe | Run No. 18 |
| --- | --- |
| Chlorinated Chlorinate polyethylene (*1) | 70 |
| A blend of vinyl chloride resin and acrylonitrile/butadiene Rubber (*2) | 30 |
| Sulfur | 2 |
| Lysine | 5 |
| Curing temperature (°C.) | 170 |
| Curing time (minutes) | 15 |
| 300% Modulus (kg/cm$^2$) | 44 |
| Tensile strength (kg/cm$^2$) | 109 |
| Elongation (%) | 450 |
| Hardness | 60 |

(*1): Same as in Example 1.
(*2): Nipol 1203J (a registered trademark for a polymer blend of vinyl chloride resin and acrylontrile/butadiene rubber in a mixing ratio of 3:7 which is made by Nippon Zeon Co., Ltd.).

EXAMPLE 10

This Example shows that a composition of chlorinated polyethylene and allyl glycidyl ethermodified epichlorohydrin rubber, brominated butyl rubber or carboxylated acrylonitrle/butadiene rubber can be well cured with a combination of sulfur and lysine.

The same experiments as in Example 1 were performed, and the results are shown in Table 10.

TABLE 10

| Compounding recipe | Run No. 19 | Run No. 20 | Run No. 21 |
| --- | --- | --- | --- |
| Chlorinated polyethylene (*1) | 70 | 5 | 40 |
| Epichlorohydrin rubber (*2) | 30 | — | — |
| Brominated butyl rubber (*3) | — | 95 | — |
| Carboxylated acrylonitrile/butadiene rubber (*4) | — | — | 60 |
| SRF-L carbon black (*5) | 30 | 30 | 30 |
| Sulfur | 1.5 | 1.5 | 1.5 |
| Lysine | 3 | 1 | 1.5 |
| Curing temperature (°C.) | 170 | 170 | 170 |
| Curing time (minutes) | 15 | 15 | 15 |
| 300 Modulus (kg/cm$^2$) | 148 | 70 | 150 |
| Tensile strength (kg/cm$^2$) | 227 | 179 | 257 |
| Elongation (%) | 490 | 570 | 430 |
| Hardness | 70 | 45 | 66 |

(*1): Same as in Example 1.
(*2): Zecron 1100 (a registered trademark for allyl glycidyl ether-modified epichlorohydrin rubber produced by Nippon Zeon Co., Ltd.).
(*3): Polysar Bromobutyl X-2 (a registered trademark for a product of Polysar Ltd.).
(*4): Krynac 221 (a registered trademark for a product of Polysar Ltd.).
(*5): Same as in Example 3.

COMPARATIVE EXAMPLE

This Example shows that a composition of chlorinated polyethylene and isoprene/isobutylene rubber (butyl rubber), the latter being a rubber outside the scope of the invention, cannot be cured with lysine and sulfur.

The experiments was carried out in the same way as in Example 1 in accordance with the compounding recipe shown in Table 11. The resulting composition was heat-treated by a hot press at 170° C. for 15 minutes. Considerable foaming occurred, and it did not cure.

TABLE 11

| Compounding recipe | |
| --- | --- |
| chlorinated polyethylene (*1) | 10 |
| Butyl rubber (*2) | 90 |
| SRF-L carbon black (*3) | 30 |
| Sulfur | 2 |
| Lysine | 3 |

(*1): Same as in Example 1.
(*2): Polysar Butyl 402 (a registered trademark for a product of Polysar Ltd.).
(*3): Same as in Example 3.

Figure 4:
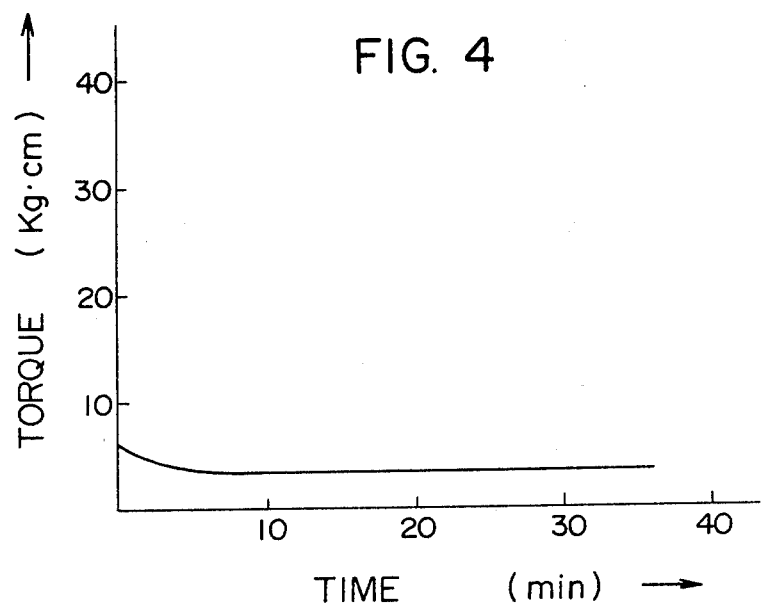

For confirmation, the torque-time curve of the composition at 170° C. was determined. As shown in FIG. 4, no rise in torque is noted, and it is evident that curing did not take place.

What we claim is:

1. A curable composition comprising a chlorinated polyethylene having a chlorine content of 5 to 50% by weight, sulfur and/or a sulfur donor, and at least one amino acid selected from the group consisting of lysine, ornithine, arginine and proline.

2. The composition of claim 1 comprising 100 parts by weight of the chlorinated polyethylene, 0.01 to 30 parts by weight of sulfur and/or the sulfur donor, and 0.01 to 30 parts by weight of the amino acid.